(12) United States Patent
Zheng

(10) Patent No.: US 11,840,002 B1
(45) Date of Patent: Dec. 12, 2023

(54) DONUT TOOLING MOLD STRUCTURE AND METHOD

(71) Applicant: COOL THINGS CORP., Santa Ana, CA (US)

(72) Inventor: Yan Ping Zheng, Shenzhen (CN)

(73) Assignee: COOL THINGS CORP., Santa Ana, CA (US)

( * ) Notice: Subject to any disclaimer, the term of this patent is extended or adjusted under 35 U.S.C. 154(b) by 0 days.

(21) Appl. No.: 17/974,795

(22) Filed: Oct. 27, 2022

(51) Int. Cl.
*B29C 45/26* (2006.01)
*B29C 45/40* (2006.01)
*B29C 45/04* (2006.01)
*B29C 45/00* (2006.01)
*B29L 31/52* (2006.01)

(52) U.S. Cl.
CPC ...... *B29C 45/2616* (2013.01); *B29C 45/0025* (2013.01); *B29C 45/0408* (2013.01); *B29C 45/40* (2013.01); *B29L 2031/529* (2013.01)

(58) Field of Classification Search
None
See application file for complete search history.

(56) References Cited

U.S. PATENT DOCUMENTS

| 1,588,668 | A | * | 6/1926 | Fairchild | ............... | B29D 23/24 |
| | | | | | | 425/40 |
| 2004/0227272 | A1 | * | 11/2004 | Saito | ................... | B29C 45/561 |
| | | | | | | 425/129.1 |

FOREIGN PATENT DOCUMENTS

KR      20100102425 A  *  9/2010

\* cited by examiner

*Primary Examiner* — Armand Melendez
(74) *Attorney, Agent, or Firm* — BACON&THOMAS,PLLC

(57) ABSTRACT

An injection molding apparatus for generally toroidal or donut-shaped articles having a hollow interior includes a hollow-interior forming member that is positioned within the mold cavity during injection to form the hollow interior of the article, and that is moved away from the mold cavity to allow removal of the molded article when the injection molding apparatus is opened following molding. The hollow-interior forming member includes an open section or gap that is closed by a gap-filling member when the injection molding apparatus is closed. When the injection molding apparatus is opened following molding, the gap-filling member vacates the open section or gap to enable the molded article to be manually separated from the annular member.

7 Claims, 12 Drawing Sheets

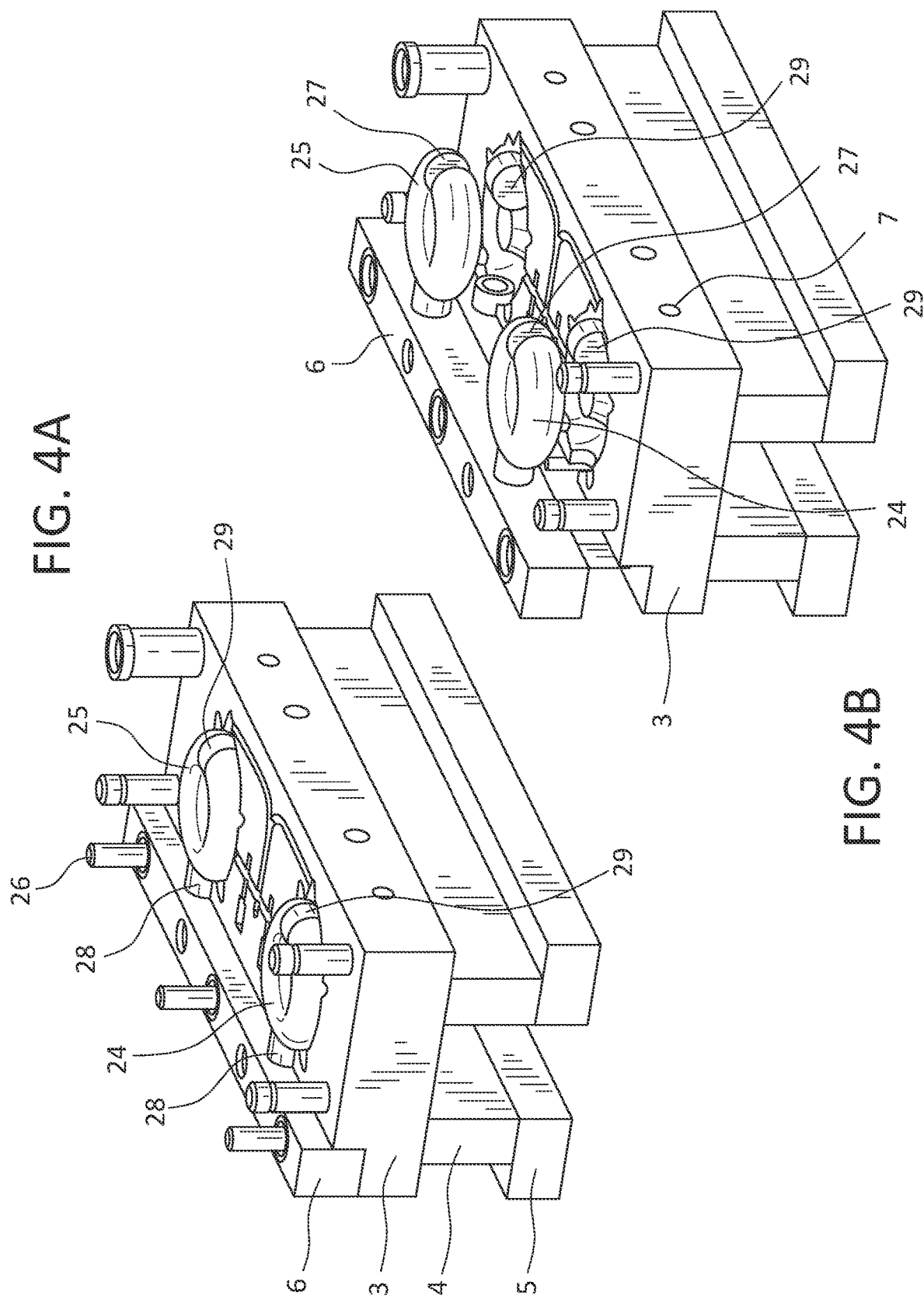

DONUT TOOLING MOLD STRUCTURE AND METHOD

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates to an injection molding apparatus and method.

More particularly, the invention relates to a donut tooling mold structure for use in an injection molding apparatus, and to a method for injection molding toroidal or donut-shaped articles having a hollow interior. The hollow toroidal or donut-shaped articles are molded in a single injection step, without the need to form the articles in at least two pieces, and to join the pieces together after molding to form the article.

2. Description of Related Art

FIGS. 1A to 1C show examples of toroidal or donut-shaped articles that may be formed by the injection molding apparatus and method of the present invention. The specific shapes and aesthetic details of the illustrated articles, which are the subject of a copyright registration, form no part of the present invention, except insofar as the hollow donut-shaped main bodies 103 of articles 100-102 are formed in one-piece. As illustrated, each of the main bodies 103 of articles 100-102 may include optional decorative appendages 104, which are molded together with the main bodies, and optional printed features 105 that cause the articles to resemble animate objects such as a jack-o-lantern 100, cat 101, or bat 102. Each main body is made of an injection molded synthetic resin, and has a hollow interior that may be filled with any of a variety of substances, such as water, glitter, shaving cream, or slime. The synthetic resin material injected into the mold to form articles 100 to 102 also forms no part of the present invention, and may include any resin or thermoplastic elastomer that can be injection molded and that remains soft and/or flexible after molding.

A problem with a hollow donut-shaped toy of the type illustrated in FIGS. 1A-1C is that manufacturers have not been able to injection mold the donut in one piece using a single injection molding step. The reason for this failure is that, in order to form a hollow interior that extends continuously over an angle of 360°, the portion of the mold that forms the interior of the donut must also extend 360°. Because the injection molded article surrounds the portion of the mold that forms the interior of the article, there is no way to separate the donut-shaped article from the interior-forming portion of the mold after injection by a conventional injection molding apparatus. While the outer portion of the donut-shaped article can be pulled out of the mold, the circular inner portion cannot be pulled out if there is no cut or gap in the interior-forming portion of the mold. But if there is a cut or gap, then the hollow interior cannot extend 360°. As a result, hollow donut-shaped articles have conventionally been manufactured by separately molding the two halves of the article, and then gluing, sewing, or otherwise fixing the two halves to each other. For the examples shown in FIGS. 1A-1C, use of the conventional manufacturing method would involve separately molding a front half and a back half, and then securing and sealing the two halves of the main body 103 along a circumference of the donut-shape. The result is an article with an unsightly seam that is vulnerable to separation and leakage when the hollow interior of the article is filled with a liquid, gelatinous, or non-solid material.

The injection molding apparatus of the present invention addresses the problem of forming a hollow interior that extends 360° around donut-shaped article, while still enabling the article to be removed from the interior-forming member, by providing a gap in the annular member that forms the interior of the donut=shaped article. According to the principles of an illustrated embodiment of the invention, the gap is closed during the injection molding process, and then opened when the plates that hold the mold cores or dies of the injection molding apparatus are moved away from each other, the open gap enabling manual separation of the injection molded article from the interior-forming member.

By way of background, a typical injection molding apparatus includes a stationary plate with a first set of mold cavities and a movable plate with a complementary second set of mold cavities. To carry out the injection molding process, the movable plate is pressed against the stationary plate such that the sets of mold cavities are aligned to form three-dimensional spaces having the shape of the article to be formed. After the material of the articles is injected into the three-dimensional spaces formed by the aligned mold cavities, the movable plate is retracted from the stationary plate, allowing the injection molded article to be removed.

As explained above, to form a donut-shaped article, it is necessary to include an additional interior-forming member that extends into the space formed by the respective mold cavities on the movable and stationary plates. For a donut-shaped article, the cavities are generally cup shaped, while the interior-forming member is annular or toroidal in shape. When resin material is injected into the cavity, the injected material completely surrounds the interior-forming member, making it impossible to separate the article from the interior-forming member without either cutting the article, or opening a gap in the interior-forming member. The present invention provides a way to automatically open a gap in the interior forming member, without requiring any additional steps on the part of the operator of the injection molding apparatus, substantially increasing injection molding time, or requiring reconstruction of the injection molding apparatus to accommodate the interior-forming member and gap opening and closing mechanism that enables the donut-shaped article to be removed from the interior-forming member.

It will be appreciated that the articles that may be injection molded according to the principles of the present invention are not limited to strictly toroidal or annular shapes with a circular inner and outer diameter. The articles manufactured according to the principles of the invention can be square, triangular, or have any other shape, so long as the hollow interior of the article forms a continuous closed loop surrounded on all sides by an exterior surface of the article. There is also no limitation as to the exterior shape of the article, or the types and shapes of appendages that may be molded together with the article.

SUMMARY OF THE INVENTION

It is accordingly a first objective of the invention to provide an injection molding device and method that enables injection molding of a hollow donut-shaped or toroidal article in one-piece with a hollow interior that extends through the article, eliminating the need to separately mold two halves of the object, and only then join the two halves together.

It is a second objective of the invention to provide a donut tooling mold structure for enabling injection molding of a hollow, one-piece, donut-shaped or toroidal article that may be used by an existing injection molding apparatus, without the need to substantially modify or reconstruct the existing apparatus.

It is a third objective of the invention to provide a donut tooling mold structure and method for enabling injection molding of a hollow, one-piece, donut-shaped or toroidal article that does not require the operator of the injection molding apparatus to carry out additional steps other than to close the apparatus, inject material into mold cavities, open the apparatus, and remove the molded article from the apparatus.

It is a fourth objective of the invention to provide a donut tooling mold structure and method for enabling injection molding of a hollow, one-piece, donut-shaped or toroidal article that does not extend the time required to mold the article, in comparison with the time required to mold articles that are not hollow.

These objectives are achieved, in accordance with principles of a preferred embodiment of the invention, by providing a donut tooling mold structure that includes at least one hollow-interior forming member, the interior-forming member being arranged to be positioned within the mold cavity during injection molding so that the material injected into the cavity surrounds the interior-forming member and is prevented from filling the space occupied by the interior-forming member. After injection, the interior-forming member is arranged to be moved a position in which an open section or gap appears in the interior-forming member to enable the resulting hollow, one-piece, donut-shaped or toroidal article to be removed from the interior-forming member and the injection molding apparatus.

The device includes a mechanism for causing the interior-forming member to be moved relative to the mold cavity plates in order to facilitate removal of the molded article via the gap that forms when the plates of the injection molding apparatus are separated and the interior-forming member is moved away from each of the plates. After removal of the molded article, the injection molding apparatus is again closed in preparation for injection At this time, the gap in the interior-forming member is automatically also closed or bridged in preparation for a subsequent injection molding operation.

The arrangement for opening and closing the gap in the interior-forming member as the injection molding apparatus is opened and closed includes, in a preferred embodiment of the invention, a gap-closing member that extends from one of the mold cavity plates to a position at which the gap-closing member is situated in the gap when the injection molding apparatus is closed. The gap closing member has a shape that corresponds to the shape of the gap so that it substantially completely fills the gap and prevents injected material from extending into the interior of the article being molded. Because the gap-closing member extends from and is fixed to one of the mold cavity plates, an opening is formed in the molded article that allows the interior-forming member to be moved away from the gap-closing member when the fixed and movable plates are separated from each other to open the mold, thereby opening the gap and allowing removal of the hollow injection molded article following completion of injection molding.

BRIEF DESCRIPTION OF THE DRAWINGS

FIGS. 4A and 4B are isometric views, take from the front, of a stationary half of an injection mold constructed in accordance with the principles of the exemplary embodiment of the invention. FIG. 4A shows a closed position and FIG. 4B shows an open position.

DETAILED DESCRIPTION OF THE PREFERRED EMBODIMENTS

Figures 1A, 1B, 1C:
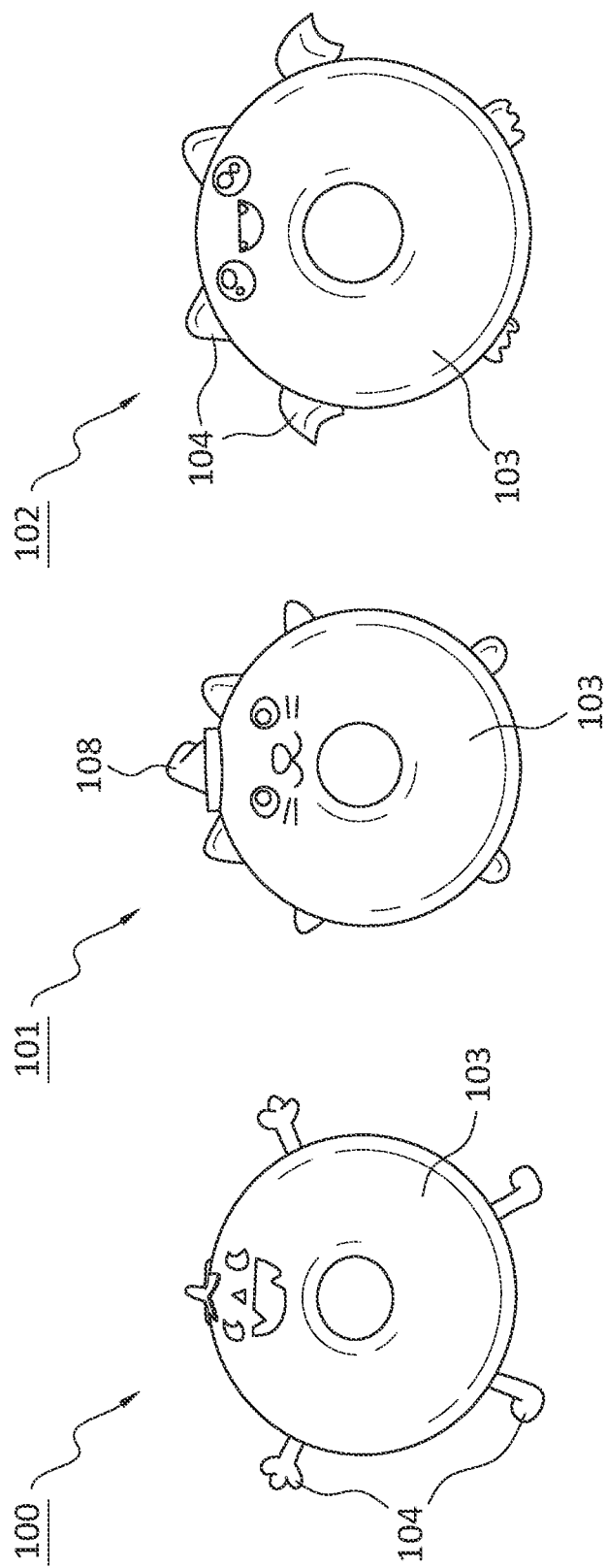
FIGS. 1A to 1C are front views of donut-shaped articles that may be manufactured according to the injection molding apparatus and method of the present invention, which allows the articles to be injection molded in one piece.
Figure 1D:
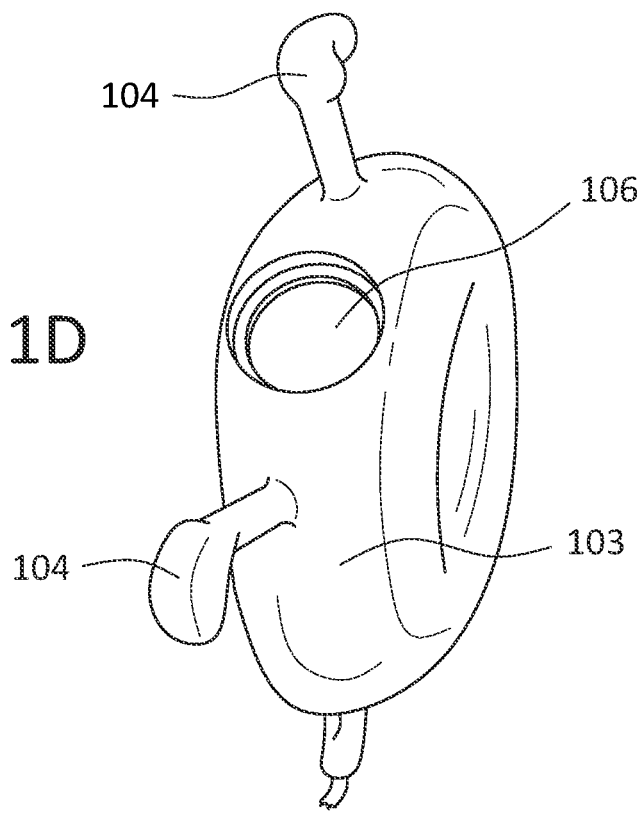
FIGS. 1D and 1E show the body of the donut-shaped article of FIG. 1A, immediately after being pulled from the injection molding machine according to an exemplary embodiment of the invention.
Figure 1E:
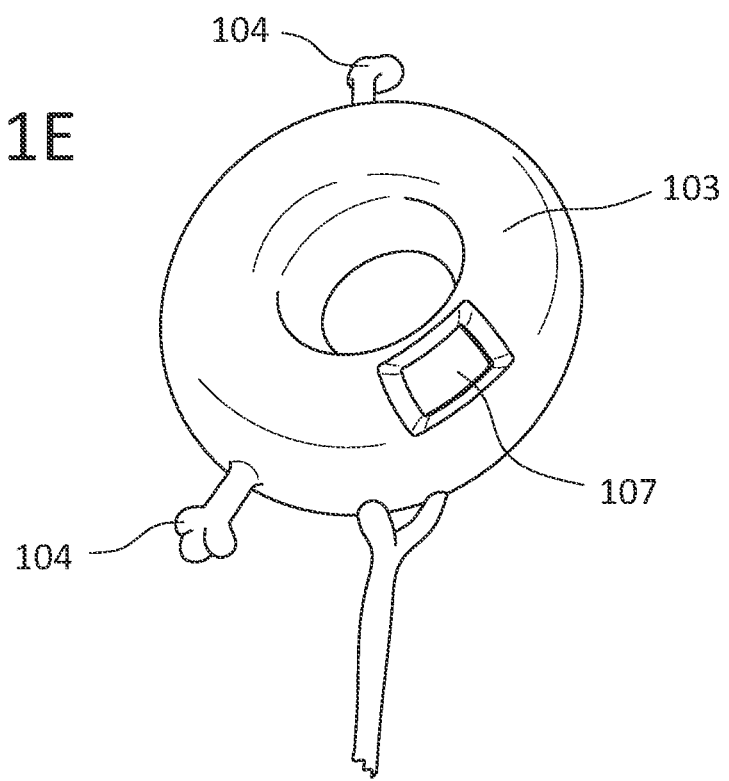

FIGS. 1D and 1E show the body of a donut-shaped article, which may be used to form the articles of FIGS. 1A-1C, immediately after being pulled from an injection molding machine in accordance with the principles of an exemplary embodiment of the invention. The donut-shaped article includes body 103 and molded appendages 104, a central donut hole 105, an opening 106 formed by the shaft 28 that supports a respective one of the hollow-interior-forming members 24 and 25, and an opening 107 formed by a support for the gap-opening-and-closing member or gap-filling 29 described below. The interior of the donut-shaped article is a continuous hollow space that extends 360° around the article, and that may be filled with any of a variety of substances, such as water, glitter, shaving cream, or slime, through one of the openings 106 and 107 before sealing the corresponding opening(s) to contain the filling.

The opening 106 formed by the shaft 28 to which the interior-forming member is fixed, as shown in FIG. 1D, allows the outside surface of the molded article to be pulled over the outside of the respective one of the interior-forming members 24 and 25, while the inside surface (which forms the "hole" in the donut) is pulled through the gap 27 in the interior-forming member 24,25.

As shown in FIG. 1E, the opening 107 in the molded article, which results from the gap-opening-and-closing or gap-filling member 29 being fixed to the mold cavity 17, allows the gap-opening and closing member 29 to exit the gap 27 and be removed from the molded article 20 during separation of the fixed and movable and stationary plates 2,3, so that the gap-opening and closing member does not interfere with removal of the molded article 20. The shape of the opening 107 depends on the shape of the portion of the gap-opening and closing member 19 that extends from the surface of the mold cavity 17, and is not limited to the rectangular shape shown in FIG. 1E.

Figure 2A:
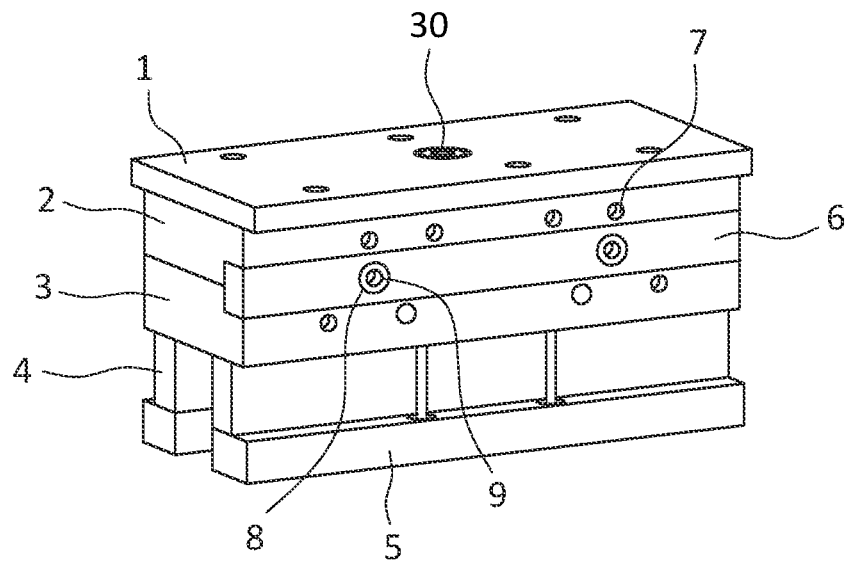
FIG. 2A is an isometric view of a portion of an injection molding apparatus that may utilize the principles of the exemplary embodiment, shown in a closed position.
Figure 2B:
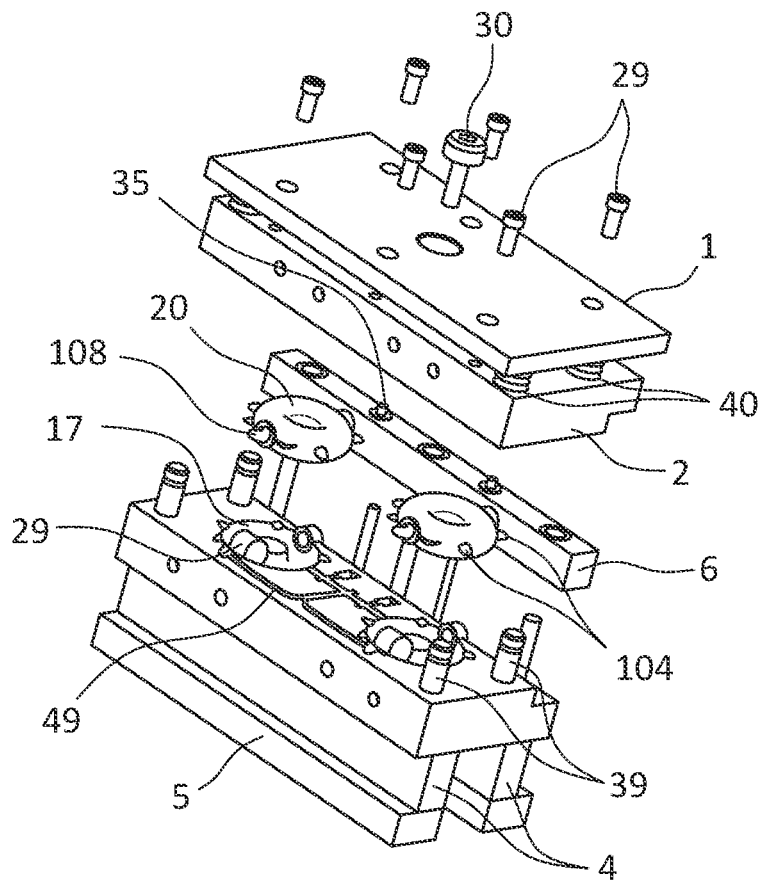
FIG. 2B is an exploded isometric view of the portion of the injection molding apparatus shown in FIG. 2A.
Figure 3:
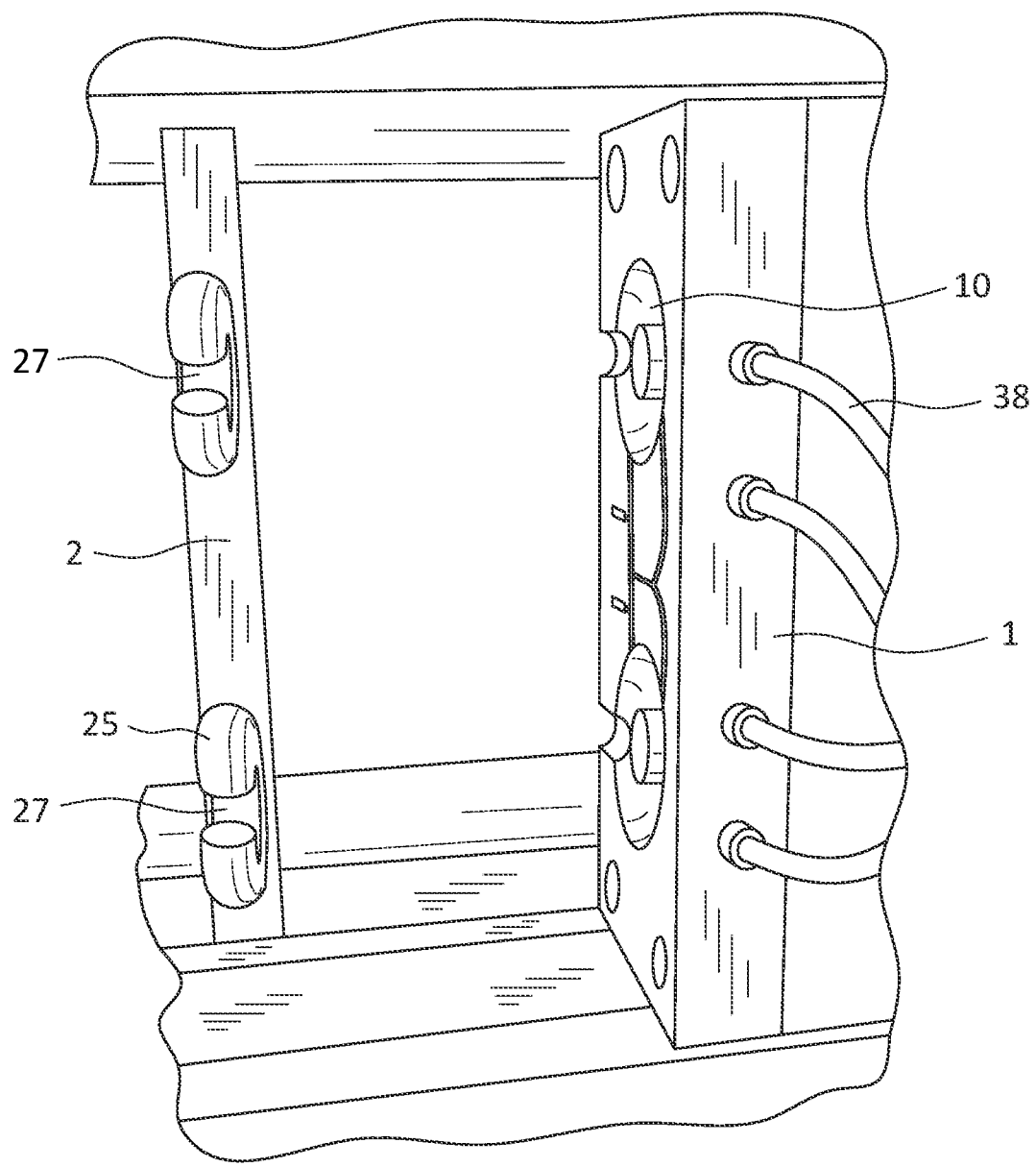
FIG. 3 is a side view of the injection molding apparatus of FIGS. 2A and 2B, shown in an open position.

FIGS. 2A and 2B shows a portion of an injection molding apparatus that may be used in connection with the method and hollow-interior-forming device of an exemplary embodiment of the invention. The portion of the injection molding apparatus shown in FIG. 2A is in a closed position. The illustrated portion of the apparatus includes a first injection molding die or core in the form of a stationary plate 2 removably secured to a stationary support 1 by screws or other fasteners 29, and a second injection molding die or core in the form of a movable plate 3 removably secured to a movable support 4 and base 5 by fasteners such as screws (now shown). As illustrated in FIG. 3, the stationary plate 2 includes a mold cavity 10. The movable plate 3 also includes a mold cavity 17, shown in FIGS. 2B, 4B, and 4D, and 4E. The two mold cavities 10 and 17 form the exterior surface of the molded article. Since respective stationary plate 2 and movable plate 3 are removably secured within the injection molding apparatus, plates 2 and 3 to be interchanged in order to change the mold cavities and allow different articles to be molded using the same apparatus.

The movable support 4 may be moved by a moving mechanism such as a screw and follower (not shown) to move the movable plate 2 towards and away from the stationary plate 2. When the movable plate 3 is moved to a position adjacent the stationary plate 2, the movable plate 3 is pressed against the stationary plate 2 so that the respective mold cavities 10 and 17 are joined and capable of receiving injected material through injection port or nozzle 30, passages 7 (which may be connected to each other by pipes or hoses 38 (shown in FIGS. 3 and 5-7), and which are in communication with the mold cavities 10 and 17 through ducts 49. Springs or resilient members 40 may be included to ensure that the movable and stationary plates are pressed tightly together and prevent injected material from escaping the mold cavities. Alignment of the stationary plate 2 and movable plate 3 may be provided by bushings 37 included in one of the stationary plate 2 and movable plate 3, and guide posts 39 extending from the other of the stationary plate 2 and movable plate 3.

Figure 4C:
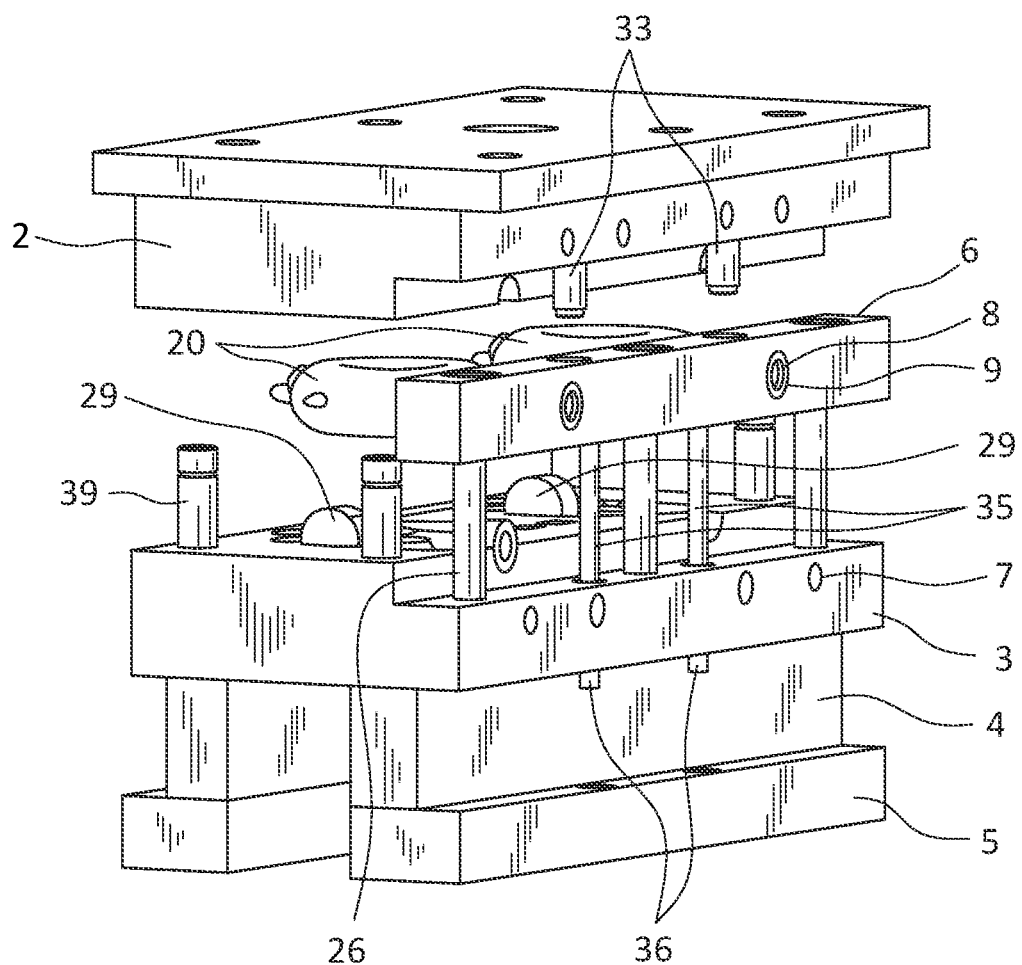
FIG. 4C is an isometric view, taken from the rear, of the injection mold apparatus of FIGS. 4A, and 4B.
Figure 4D:
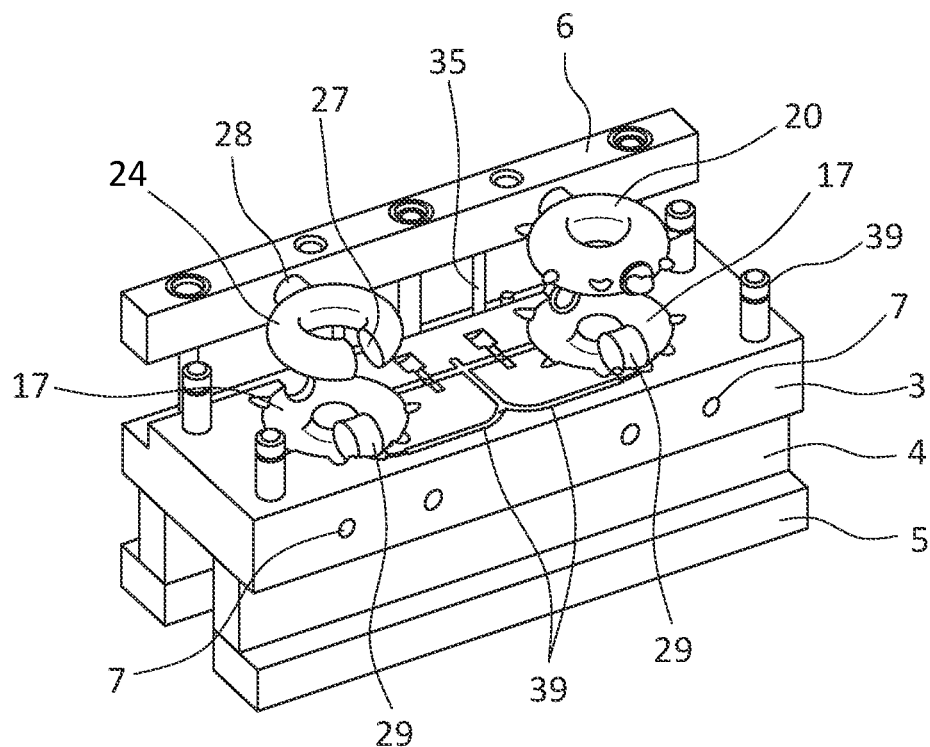
FIGS. 4D and 4E are additional isometric views of the portion of the injection molding apparatus shown in FIGS. 4A and 4B, in respective open and closed positions.
Figure 4E:
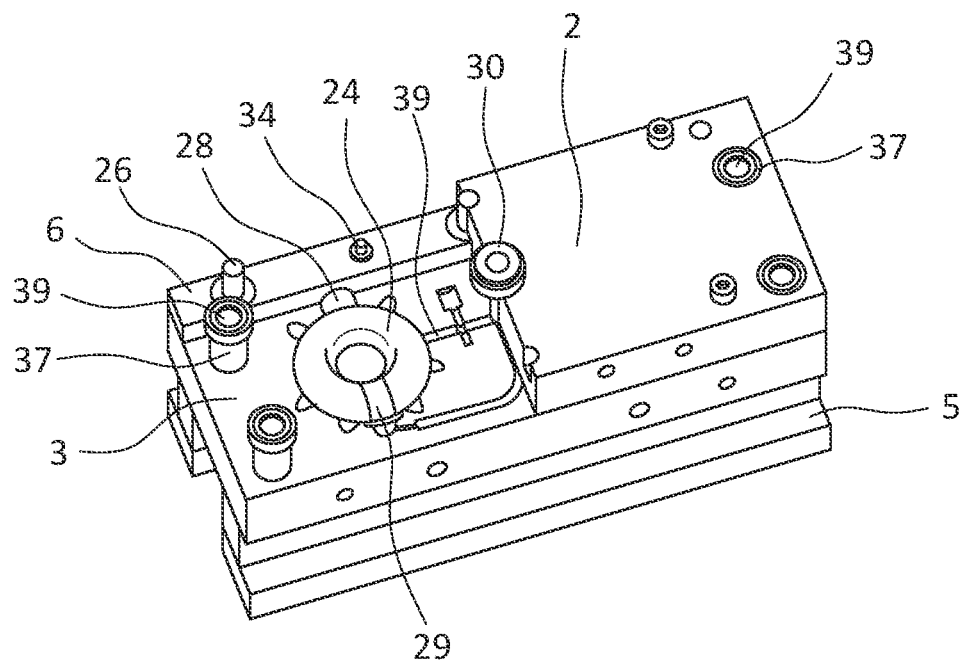

Also shown in FIGS. 2A and 2B, as well as in FIGS. 3 and 4A-4E, are an arrangement for forming hollow interiors of donut shaped articles, in accordance with the principles of a preferred embodiment of the invention. Illustrated are two annular or toroidal interior-forming members 24 and 25. FIGS. 2B and 4C show the situation in which the two toroidal interior-forming members 24 and 25 are enclosed within a resin material 20 following injection molding and opening of the injection molding apparatus. On the other hand, uncovered interior-forming members 24 and 25 are shown in FIGS. 4A and 4B, while FIG. 4E shows a situation in which only one of the molds has been injected with a resin material, so that the interior-forming member 24 is still uncovered while the interior-forming member 25 is enclosed within the molded article. The injection molded article shown in FIG. 4E corresponds to the "cat" 101 of FIG. 1B, and includes molded-in appendages 104 representing arms, legs, ears, and a hat (108) for the cat. There is of course no limitation as to the shapes and locations of appendages 104.

The interior-forming members 24 and 25 are removably secured to elongated bar-shaped actuator member 6 by fixing screws 9 and countersunk screw holes 8, and the actuator member 6 is slidably mounted on guide posts 26 extending from the movable member 3 via bearing holes 27.

It will be appreciated that the fixing screws 9 extend through the actuator member 6 and are screwed into shafts 28 of the interior-forming members 24 and 25, resulting in the formation of opening 106, shown in FIG. 1D, during the molding process. As explained below, openings 106 enable molded articles to be removed from the interior forming members 24 and 25 after completion of an injection operation.

Those skilled in the art will also appreciate, that although two annular or toroidal interior-forming structures 24 and 25 are shown, it is within the scope of the invention to provide just one such structure, or more than two such structures.

Movement of the actuator 6 and toroidal interior-forming structures 24 and 25 towards and away from the movable plate 3 may be accomplished through the use of parting lock members 33 and 34 and sliding pins 35, shown in FIG. 4C. Parting lock members 33 extend from the stationary plate 2 and engage complementary parting lock members 34 positioned in openings in the actuator 6 when the movable plate 3 is adjacent the stationary plate 2. Sliding pins 35, which included stoppers 36, are fixed to the actuator 6 and slidably extend through openings in the movable plate 3 such that, when the movable plate 3 is adjacent the stationary plate 2, the stoppers 36 are spaced from the movable plate 3.

When the injection mold is opened and movable plate 3 is moved away from the stationary plate 2, the parting lock members 33 and 34 continue to be engaged to each other (by friction or adhesion), which causes the actuator 6 to be pulled away from the movable plate 3. At this time, the sliding pins 35 also move with the actuator 6, so that the stoppers 36 approach the bottom of the movable plate 3. When the stoppers 36 reach the bottom of the movable plate 3, the actuator 6 can no longer be moved away from the movable plate 3, overcoming the friction or adhesion that holds the complementary parting lock members 33 and 34 together, which causes the lock members 33 and 34 to separate from each other. The actuator 6 then remains stationary, a fixed distance from the movable plate 3, while the movable plate 3 continues to move away from the stationary plate 2 in order to fully open the injection mold.

When the injection molding apparatus is closed, the actuator 6 is pushed by the movable plate 3 against the stationary plate 2, causing the parting lock members 33 and 34 to re-engage with each other and actuator member 6 to move towards the movable plate 3, thereby causing the toroidal interior-forming members 24 and 25 to enter the mold cavities 10 and 17. When the injection mold is again opened, the parting lock members 33 and 34 again pull the actuator member 6 away from the movable plate 3, separating the toroidal interior-forming cavities 24 and 25 from the cavities 10 and 17, and enabling removal of the molded article(s) from the injection molding apparatus.

FIG. 3 shows an open position of the injection molding apparatus, in which the movable plate 1 (not shown in FIG. 3) has been moved away from the stationary plate 2. In this position, the interior-forming structures have been moved away from both the stationary plate 2 and the movable plate 3, enabling removal of a molded article from the interior-forming structures, as explained in more detail below. In this position, the gaps or open sections 27 in toroidal interior forming structures 24 and 25 that enable separation of the molded article 20 are visible.

The manner in which the gaps or open sections 27 are opened and closed to enable formation of hollow interior in a donut-shaped article, while also enabling removal of the article after molding, will now be further described in connection with FIGS. 4A-4F and FIGS. 5-8. It will be appreciated that, if the gap or open section 27 is not closed, it would not be possible to permit the hollow interior of the finished article to extend 360° around the article since the injected material would fill the gap. In order to form a 360° donut-shaped object, it is necessary that the toroidal interior-forming members 24 and 25 not have a gap or open section when the injection molding apparatus is closed and material is being injected. On the other hand, in the absence of a gap or open section 27, the molded donut-shaped object cannot be pulled off of the toroidal interior-forming structure after completion of injection and opening of the apparatus.

To solve the problem of filling or closing the gap when the apparatus is closed, and opening the gap when the apparatus is opened, the apparatus of the illustrated embodiment includes, in the movable plate 3, the above described gap-opening and closing, or gap-filling, member 29, whose operation can be understood from FIGS. 4A-4E.

Figure 4F:
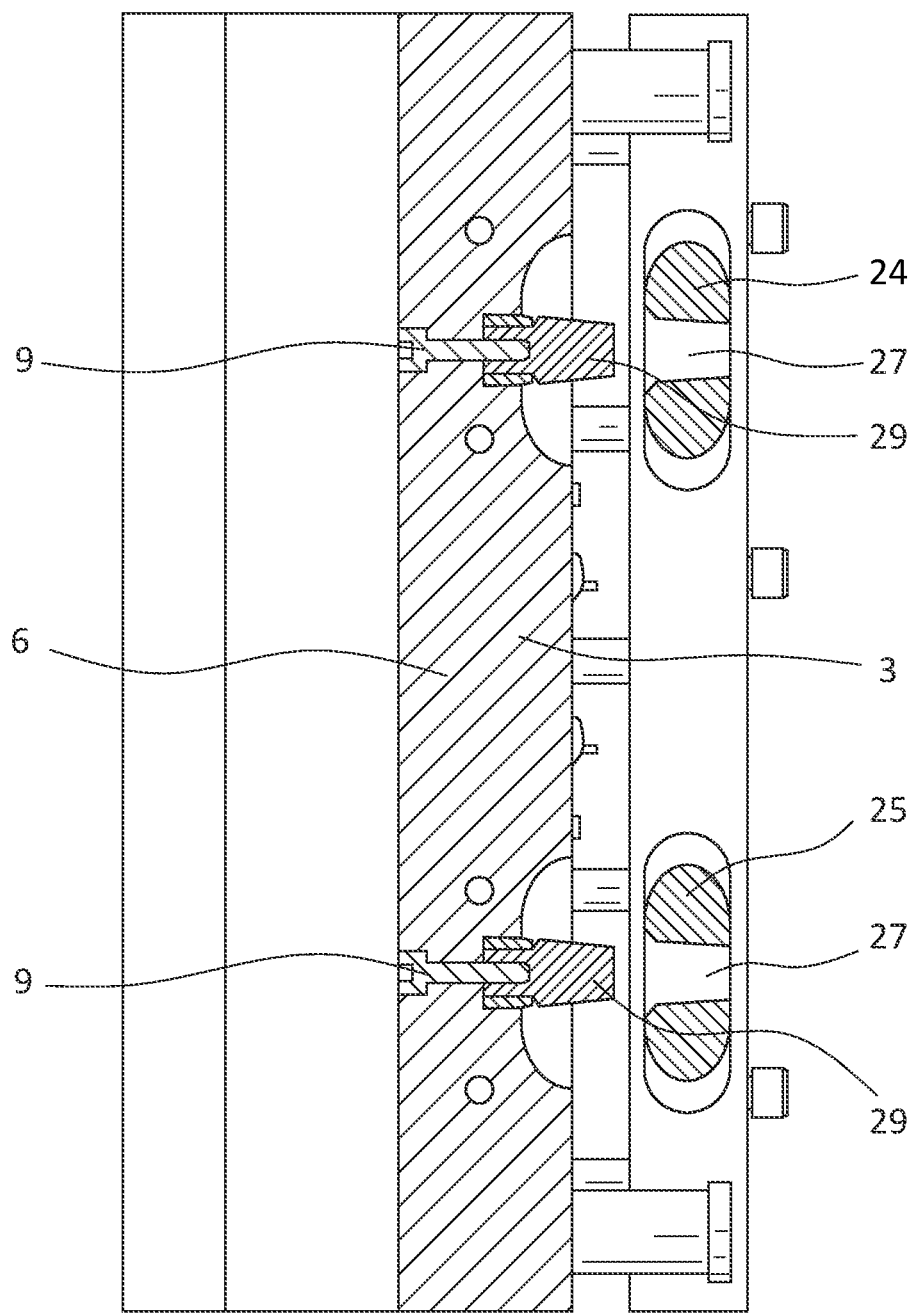
FIG. 4F is a side view of the portion of the injection molding apparatus shown in FIGS. 4A to 4E.
Figure 5:
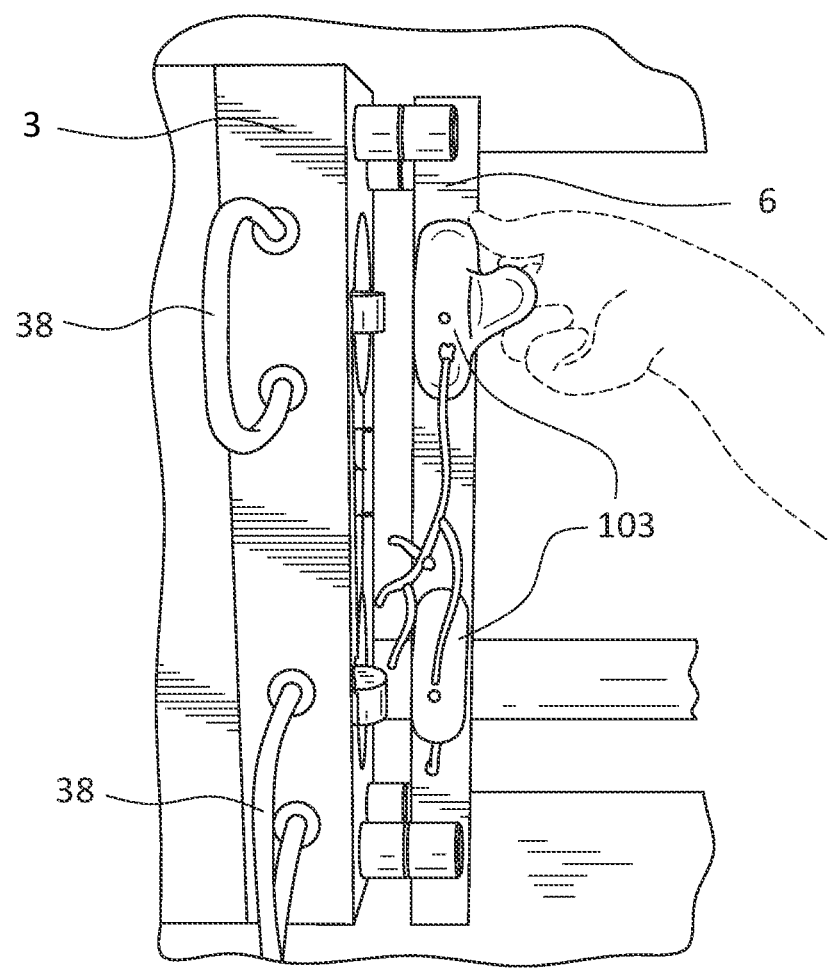
FIGS. 5-8 illustrated the manner in which the injection molded, one-piece donut-shaped object may be pulled from the injection molding machine following completion of molding and opening of the apparatus.
Figure 6:
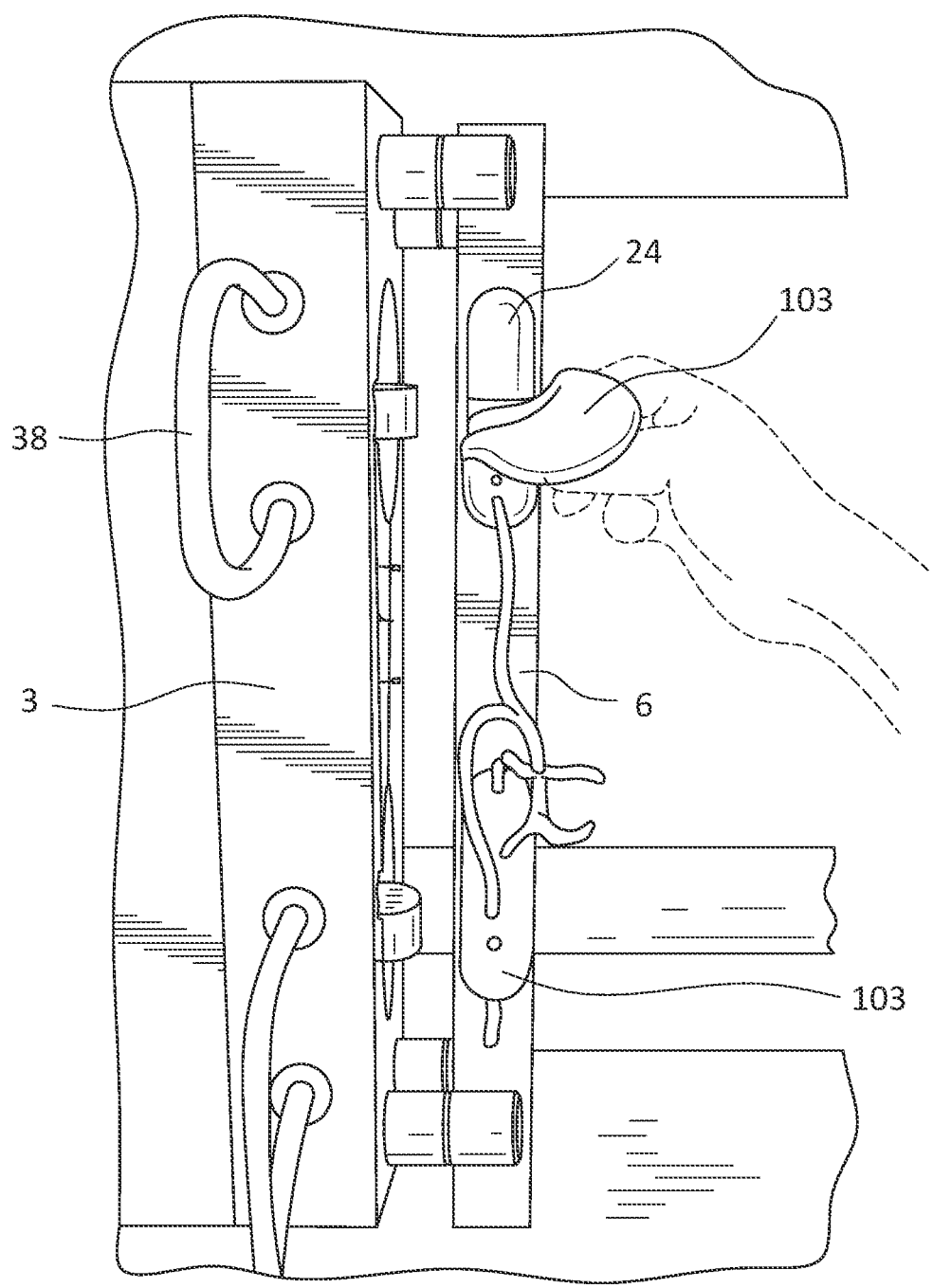
Figure 7:
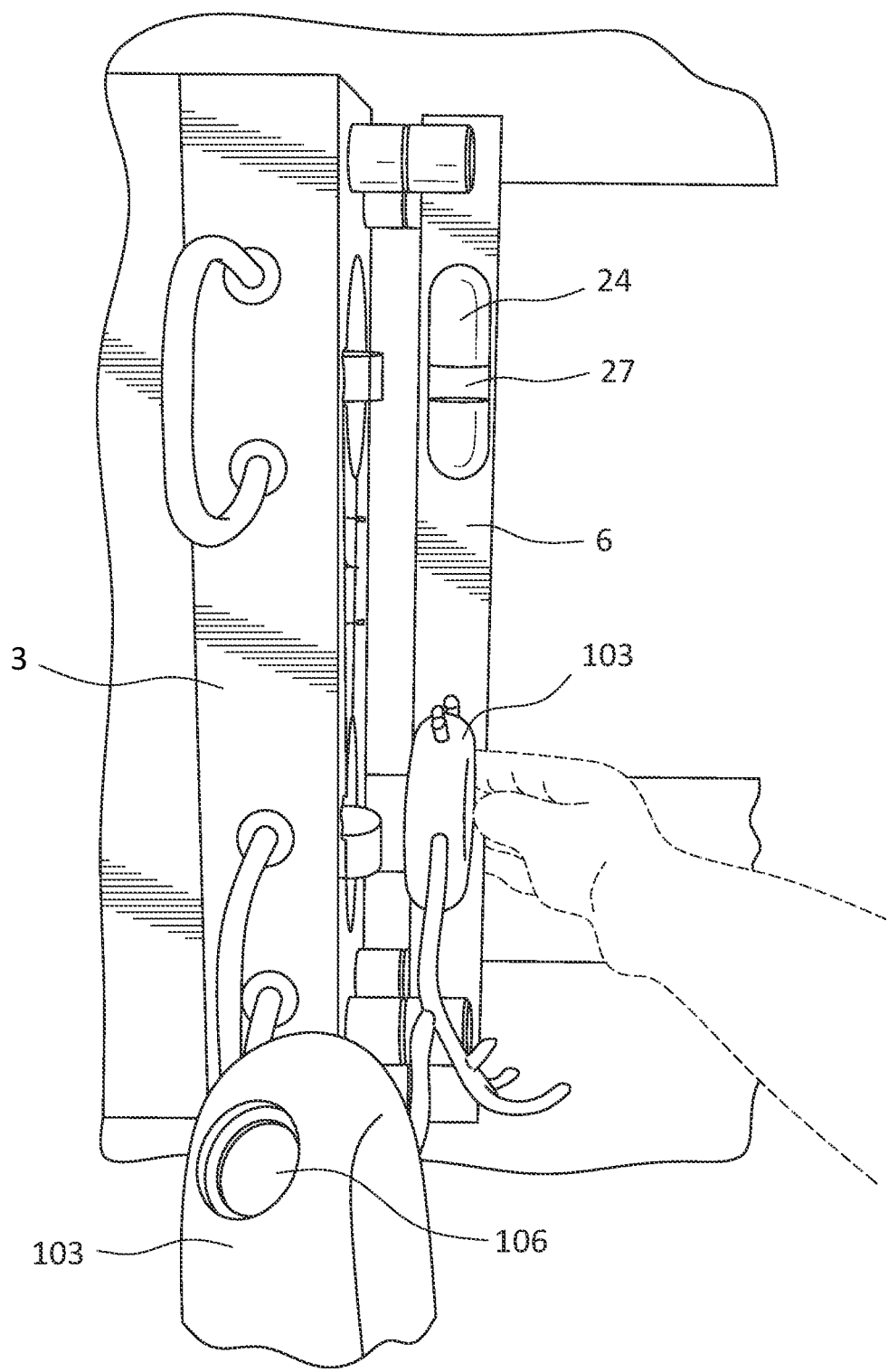
Figure 8:
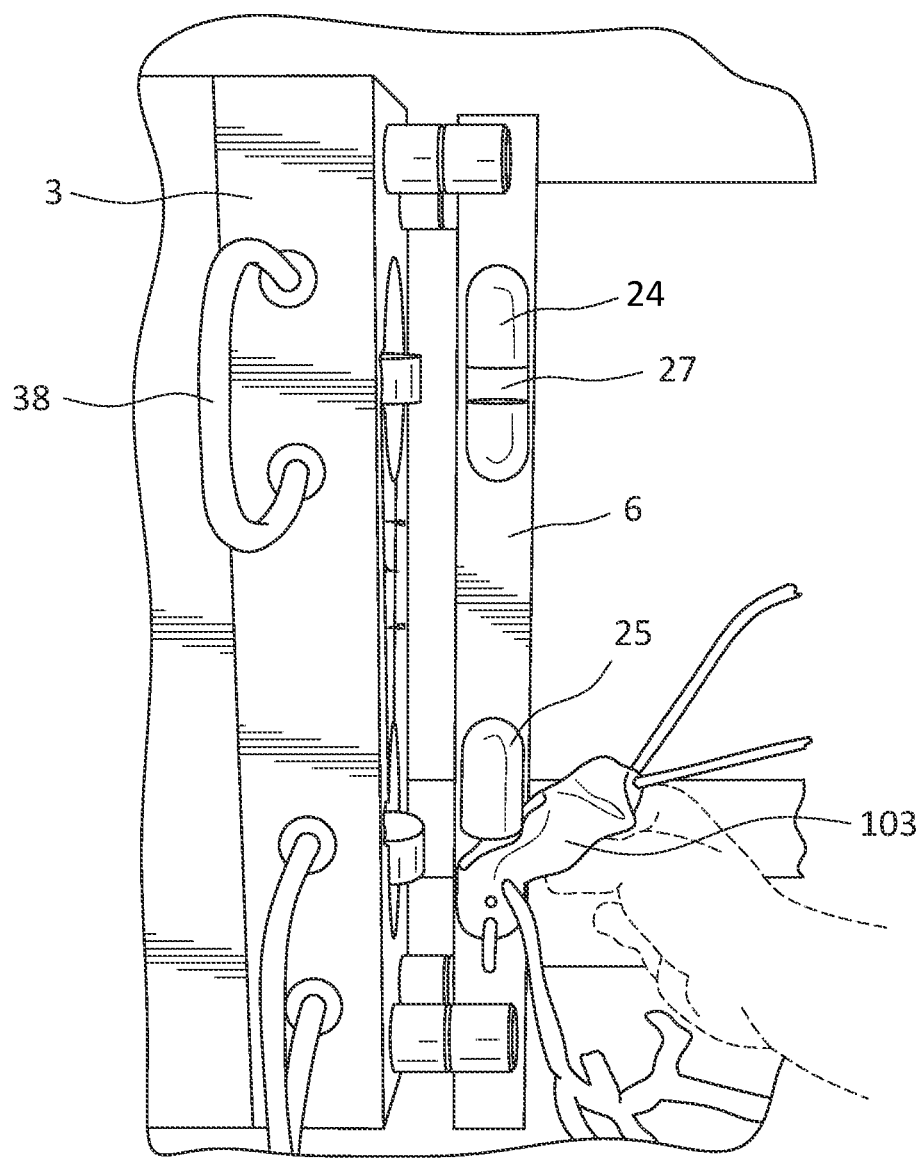

As shown in FIGS. 4A and 4F, when the molding apparatus is in the closed position, the toroidal interior-forming structures 24 and 25 are situated partially within, but spaced from surfaces of the cavities 10 and 17 that together form the main body of the final product, leaving a space that surrounds the interior-forming structures 24 and 25, and which is filled with resin material to form the hollow donut-shaped main body of the donut-shaped article 20. In this fully closed position, gap-filling structures 29 extend into the open section or gap 27 in the toroidal structure 24 to fore a closed toroid that extends over an angle of 360°. When the injection molding apparatus is opened and movable plate 2 is moved away from stationary plate 1, as show in FIGS. 4B-4D and 4G, the interior-forming structures 24 and 25 are also moved away from the movable plate 2. However, because gap-filling members 29 are fixed to the movable plate 2, they are separated from the toroidal interior forming structures 24 and 25 as the toroidal interior forming structures 24 and 25 move away from the movable plate 2, and therefor no longer fill the open section or gap 27, allowing removal of the molded article from the toroidal interior-forming structures 24 by manually pulling on the molded article in the area adjacent opening 106, as best shown in FIGS. 5 and 7, and then pulling the molded article 20 through the open section or gap 27, as shown in FIGS. 6 and 8.

Because the molded article 20 surrounds a respective one of the toroidal interior-forming structures 24 and 25 after injection of resin material, the molded object remains on the toroidal interior-forming structure 24 or 25 as it is moved away from the movable plate 3, the molded donut-shaped object can easily be removed from the injection molding apparatus by manually peeling it off of the toroidal interior-forming structure 24 or 25, as illustrated in FIGS. 5-8. On the other hand, because the molded article surrounds the toroidal interior-forming structure 24, it would not be possible to peel the injection molded article from the toroidal interior-forming structure 24 or 25 when in the spaced position without the addition of the open section or gap 27 in the toroidal interior-forming structure 24 or 25, as is apparent from FIGS. 4A and 4F. The open section or gap 27 allows the donut-shaped object to be manually pulled from the injection mold, while still enabling formation of the 360° interior space with the molded article doe to closure of the open section or gap 27 by gap-closing structure 29.

Although a number of embodiments of the invention have been described in detail in connection with the accompanying drawings, it will be appreciated that modifications of the illustrated embodiments may be made without departing from the scope of the invention. For example, details of the movable and stationary plates, and their respective supporting and moving arrangements, may be varied to accommodate requirements of different injection molding apparatuses. In addition, the shapes of the mold cavities and the interior-forming structures may be varied to form different article designs. Any such modifications may be considered to be within the scope of the invention, which is to be defined solely by the appended claims.

What is claimed is:

1. A method of molding a generally toroidal or donut-shaped article, comprising steps of: securing, in an injection molding apparatus, a stationary plate including a first mold cavity; securing, in an injection molding apparatus, a movable plate including a second mold cavity that cooperates with the first mold cavity to form a molded, one-piece, generally toroidal or donut-shaped article when the movable plate is moved against the stationary plate, and a material of the generally toroidal or donut-shaped article is injected into the opening formed by the two cavities; positioning at least one hollow-interior forming structure within the opening formed by the two cavities when the movable plate is moved against the stationary plate, but that is spaced from surfaces of the respective cavities to prevent the material of the generally toroidal or donut-shaped article from filling the space occupied by the hollow-interior forming structure and therefore form a hollow interior of the generally toroidal or donut-shaped article, wherein the hollow-interior forming structure includes an open section or gap comprising a radial cross section of the toroid or donut shape, and causing a gap-filling member that extends from one of the first or second mold cavities to fill the open section or gap when the injection molding apparatus is closed, and to vacate the gap when the injection molding apparatus is opened, thereby enabling separation and removal of the molded donut-shaped article from the hollow-interior forming structure upon completion of injection and opening of the injection molding apparatus.

2. A method of molding a generally toroidal or donut-shaped article as claimed in claim 1, further comprising the step of securing the hollow-interior forming structure to an actuator member that moves the hollow-interior forming structure towards and away from one of the stationary or movable plate when the injection molding apparatus is respectively closed or opened.

3. A method of molding a generally toroidal or donut-shaped article as claimed in claim 1, further comprising the step of causing parting lock members to engage each other when the movable and stationary plates are adjacent each other such that movement of the movable plate away from the stationary plate causes the actuator to be pulled away from the movable plate, thereby moving the hollow-interior structure away from a respective one of the mold cavities to enable removal of the generally toroidal or donut-shaped article from the hollow-interior forming structure, wherein movement of the actuator away from a first side of the movable plate causes a stopper at a distal end of a sliding pin fixed to the actuator to move towards and engage an opposite side of the movable plate to prevent further movement of the actuator and cause the parting lock members to disengage.

4. A method of molding a generally toroidal or donut-shaped article as claimed in claim 1, wherein the gap-filling member has a shape that matches a shape of the open section of gap so as to fill the gap during injection molding and thereby ensure that the hollow interior of the generally toroidal or donut-shaped article extends 360° around an interior of the generally toroidal or donut-shaped article.

5. A method of molding a generally toroidal or donut-shaped article as claimed in claim 1, wherein the gap-filling member is fixed to and extends from a surface of one of the cavities.

6. A method of molding a generally toroidal or donut-shaped article as claimed in claim 5, wherein said one of the cavities is in the movable plate.

7. A method of molding a generally toroidal or donut-shaped article as claimed in claim 1, wherein the hollow-interior forming structure includes a shaft that is removable secured to the actuator member, and wherein the shaft forms an opening in the generally toroidal or donut-shaped article, the opening being manually pulled over the hollow-interior forming member during separation of the generally toroidal or donut-shaped article following injection molding and opening of the injection molding apparatus, followed by pulling of the generally toroidal or donut-shaped article through the open section of gap to complete the removal.

\* \* \* \* \*